Oct. 20, 1970  K. STEPANEK ET AL  3,534,482
METHOD OF MEASURING THE UNIFORMITY OF TRANSMISSION GEARS
Filed April 22, 1969  2 Sheets-Sheet 1

INVENTORS
Karel Stepanek,
Jaroslav Bauer

By Richard Ernst agt

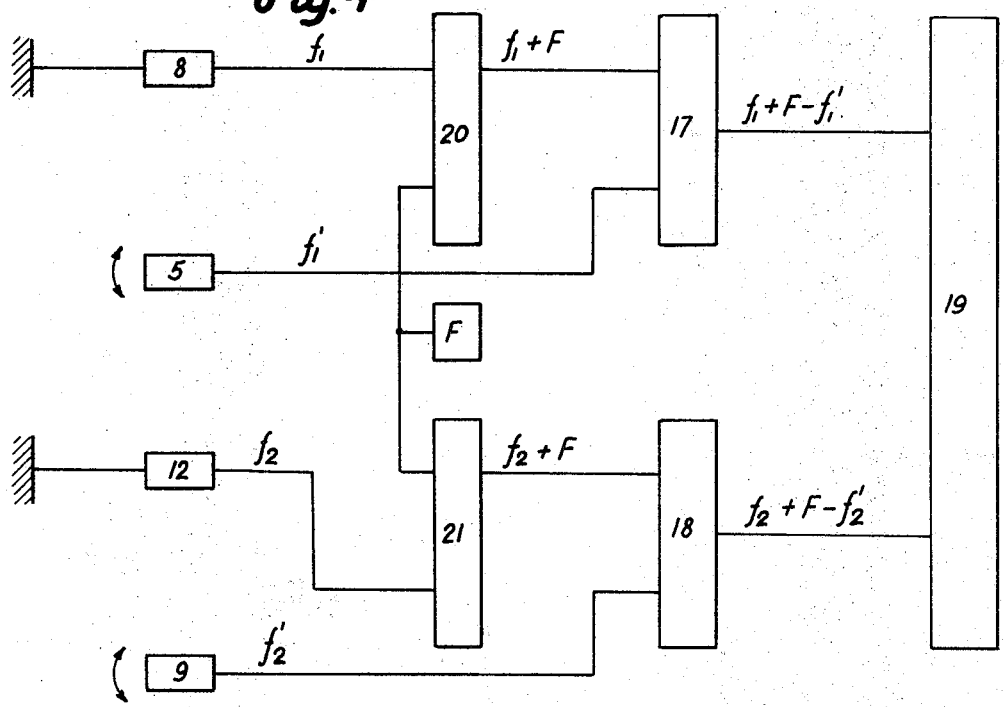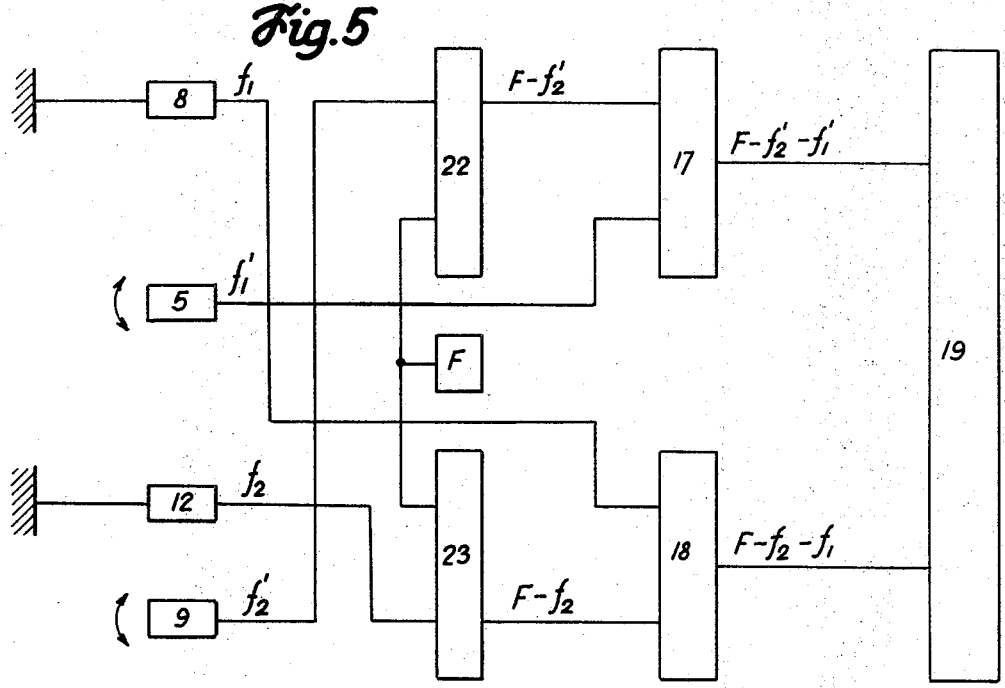

3,534,482
METHOD OF MEASURING THE UNIFORMITY
OF TRANSMISSION GEARS
Karel Stepanek and Jaroslav Bauer, Prague, Czechoslovakia, assignors to Vyzkumny ustav obrabecich stroju a obrabeni, Prague, Czechoslovakia
Continuation-in-part of application Ser. No. 552,088, May 23, 1966. This application Apr. 22, 1969, Ser. No. 818,379
Claims priority, application Czechoslovakia, June 2, 1965, 3,576/65
Int. Cl. G01b 7/28
U.S. Cl. 33—179.5    5 Claims

ABSTRACT OF THE DISCLOSURE

The phase deviations of two frequencies, corresponding to transmission errors, are measured. A first fixed pickup head derives a first recorded frequency from a first track on a first rotating drum and a second fixed pickup head derives a second recorded frequency from a first track on a second rotating drum. A first rotating pickup head derives a third recorded frequency from a second track on the first drum and a second rotating pickup head derives a fourth recorded frequency from a second track on the second drum. The phase deviations between the difference between the first and second recorded frequencies and the difference between the third and fourth recorded frequencies is measured and indicates transmission error regardless of the rotary speed of gears driven by the same shafts as the rotating pickup heads.

CROSS-REFERENCE TO RELATED APPLICATION

This application is a continuation-in-part of our copending application Ser. No. 552,088, now abandoned May 23, 1966.

SUMMARY OF THE INVENTION

The measuring of the precision of a gear transmission system is a rather delicate problem of technique. The precision of a gear transmission is determined by the course of the kinematic error, which indicates the deviation of the actual gear transmission with respect to an ideal gear transmission of the same size. These deviations are measured in circumferential or angular units, for example, angular seconds.

The definition of the kinematic error requires that the respective measuring device provides an ideal gear transmission of the same size as the measured one in order to measure differences between both gear transmissions. This has been generally accomplished by means of friction, band or toothed transmission and by different mechanical, electrical or other instruments to measure the angular differences.

These systems are inaccurate and limited in their application, since they require a different transmission for each different size of gear transmission to be measured, for example, a plurality of friction wheels.

U.S. Pat. No. 3,096,590 describes a method and apparatus for measuring the uniformity of gear transmissions using the principle of magnetic records. The method for measuring the precision of transmissions according to the patent disclosure is based on measurements of the phase deviations of two frequencies. These phase deviations correspond to transmission errors. The magnitude of the frequencies is proportional to the revolutions of the measured transmission. Since measurements of phase deviations require both measured frequencies to be higher than a certain minimum frequency such as, for example, higher than 20 cycles per second, precision measurements transmission precision must proceed at higher rotary speeds than minimum speeds corresponding to the minimum available frequency.

It is an object of this invention to provide a method for measuring the precision of transmissions where the magnitude of frequencies, the relative phase deviations of which are to be measured, are independent of the speed of transmission and have a magnitude different from zero even at zero transmission speed. The measuring method is static and is independent of the speed of the measured transmission.

DESCRIPTION OF THE INVENTION

Figure 1:
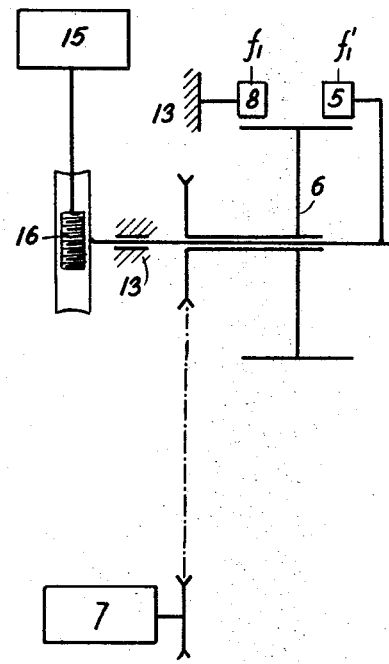

The method of the present invention for measuring the precision of transmissions will be explained with reference to the accompanying drawings in which:

FIG. 1 is a schematic diagram of an apparatus according to the invention; and

FIGS. 2 thru 5 are block diagrams of the electrical circuits of different embodiments.

The present invention relates to a method of signals processing, induced by rotation of drums 6 and 10 (see FIG. 1) with magnetic recording in fixed magnetic heads 8, 12 and in rotating magnetic heads 5 and 9. The method of pulsing is an object of the aforementioned U.S. Pat. No. 3,096,590. Since the patent describes the function of a clutch, it is not described in the present application. The present disclosure is limited to measurement, record sensing and recording by the method described in the patent.

The measured transmission of gears 1 and 2 rotates in slow revolutions, for example, one revolution per minute of the gear 1 by means of an electric motor not shown. Simultaneously with the rotation of the measured gears 1 and 2 the corresponding rotating heads 5 and 9 rotate at the same rotary speed. The drum 6 and 10, provided with magnetic recording tracks, are rotated at high speed, for example 10 revolutions per second, by electric motors 7 and 11. Each of the drums is provided with two recording tarcks which induce in the fixed pickup heads 8, 12 and in the rotating pickup heads 5, 9 the intermittent electric signals of specific frequencies. The method of the frequency processing is an object of the invention and is described in the initial disclosure. It is obvious from the description of the invention that the clutch is not necessary. It is therefore not shown in the drawing.

In FIG. 1, the transmission to be measured is represented by the two intermeshing gears 1 and 2 affixed to and rotating with a shaft 3 and 4, respectively. The shaft 3 is rotatably mounted or supported by a machine frame 13. The shaft 4 is rotatably mounted or supported by a frame 14 of the support. The frame 14 may be displaced in directions of the double arrow in order to permit measurements of gears of different size. The drum 6 is freely rotatable coaxially around the shaft 3 and the drum 10 is freely rotatable coaxially around the shaft 4. The drums 6 and 10 rotate around the shafts 3 and 4 at arbitrarily high speed, for example, the drum 6 at $n_1 = 15$ revolutions per second and the drum 10 at $n_2 = 10$ revolutions per second. The rotary speed of the drums need not be precise or uniform. The drums 6 and 10 are driven by an electric motor 7 and 11, respectively, by means of belt transmissions.

Each of the drums 6 and 10 is provided on its circumference with two recording tracks similar to the recording tracks of tape recorders. A magnetic pickup head cooperates with each of said tracks. The pickup head 8 is immovably affixed to the machine frame 13. The pickup head 5 is affixed to and rotates with the shaft 3.

The pickup head 12 is immovably affixed to the frame 14 of the support and the pickup head 9 is rotatably affixed to and rotates with the shaft 4.

Magnetic records of sinusoidal waveform are provided on recording tracks of drums 6 and 10. These records may, for example, be obtained by the method described in U.S. Pat. No. 3,096,590. It is a condition that both tracks on one drum contain the same number of magnetic sine wave cycles and that the number of magnetic cycles on both drums correspond to the transmission ratio of the measured transmission.

If, for example, the measured gear 1 has $z_1=30$ teeth and the measured gear 2 has $z_2=60$ teeth, the measured ratio $$i = \frac{z_2}{z_1} = 2$$

If the number of magnetic sine waves of the recording tracks of drum 6 is selected to be $z_5=z_8=1000$, then the number of magnetic sine waves on recording tracks of drum 10 must be $z_9=z_{12}=(z_5)(2)=2000$. The indexes of the wave cycle numbers represent the reference numbers of the corresponding pickup heads.

In the course of measuring, the measured gear is slowly rotated, driven by the electric motor 15 through the worm gear 16. The speed of the shaft 3 is, for example, $k_1=0.2$ rev./sec. The speed of the shaft 4 is, in such case, $$k_2 = \frac{k_1}{i} = 0.1$$

revolutions per second.

Signals of the following frequencies are induced in the individual magnetic pickup heads Head 8—$f_1 = z_1 n_1 = (1000)(15) = 15,000$ cycles per second Head 5—$f'_1 = z_1 n_1 \pm z_1 k_1 = 15,000 \pm 200$ cycles per second Head 12—$f_2 = z_2 n_2 = (2000)(10) = 20,000$ cycles per second Head 9—$f'_2 = z_2 n_2 \pm z_2 n_2 = 20,000 \pm 200$ cycles per second The induced frequency of the fixed heads 8 and 12 is determined by the product of the number of sine wave cycles of the record and the speed of the drum.

The induced frequency of the rotating heads 5 and 9 is, as long as these heads remain at standstill, the same as that of the fixed heads 8 and 12. If the heads 5 and 9 are rotating with the shafts 3 and 4 at speeds of $k_1$ and $k_2$, respectively, the induced frequencies are increased or decreased for the products $z_1 k_1$ or $z_2 k_2$ of the number of sine wave cycles of magnetic records and the speed of the heads. There is an increase in the frequency if the head rotates in opposite direction to the direction of rotation of the drum and a decrease in the frequency if the head rotates in the direction of rotation of the drum. Since $$k = \frac{k_1}{k_2} = \frac{z_2}{z_1}$$

$$z_1 k_1 = z_2 k_2$$

The fundamental principle of measuring the precision of transmissions of U.S. Pat. No. 3,096,590 and according to this invention is the measuring of phase deviations between two frequencies which are provided by both magnetic pickup heads. A fundamental condition for measuring phase deviations between two frequencies is that the mean value of these frequencies is the same.

Since the frequencies provided by the pickup heads 5, 8, 9 and 12 are different, however, it is necessary to adjust them without influencing phase deviations, which we want to measure. This is accomplished in accordance with the known principle that phase deviations are not influenced by adding or subtracting frequencies. According to U.S. Pat. No. 3,096,590 equal frequencies are provided by subtracting the number of cycles from the fixed and rotatable pickup heads.

Equal difference frequencies are thus obtained:

$\Delta f_1 = f'_1 - f_1 = z_1 k_1 = 200$ cycles per second
$\Delta f_2 = f'_2 - f_2 = z_2 k_2 = 200$ cycles per second
$\Delta f_1 = \Delta f_2$, since $z_1 k_1 = z_2 k_2$ It is obvious that the equations $z_1 k_1 = z_2 k_2$ and $\Delta f_1 = \Delta f_2$ are valid for the mean values of speeds $k_1$ and $k_2$. Due to inaccuracies of the measured transmission of gears 1 and 2, the speeds $k_1$ and $k_2$ fluctuate relative to each other so that $k_1 \neq i k_2$. This fluctuation influences the frequencies $\Delta f_1$ and $\Delta f_2$ and causes phase deviations between said frequencies. The measured phase deviations are therefore directly proportional to the inaccuracy of the measured transmission. If we produce frequencies between which we measure changes according to the method of U.S. Pat. No. 3,096,590, these frequencies depend upon the speeds $k_1$ and $k_2$ of the measured transmission.

If the transmission is at a standstill, $k_1 = k_2 = 0$, and equally $\Delta f_1 = \Delta f_2 = 0$.

The measuring is therefore not static. At very small speeds $k_1$ and $k_2$ these frequencies are so low that it is impossible to measure phase deviations with current phase meters. The minimum frequency which can be used with these phase meters is 20 cycles per second. Thus, minimum revolutions of the measured transmission are determined at $k_1 = 0.02$ revolution per second and $k_2 = 0.01$ revolution per second.

Figure 2:
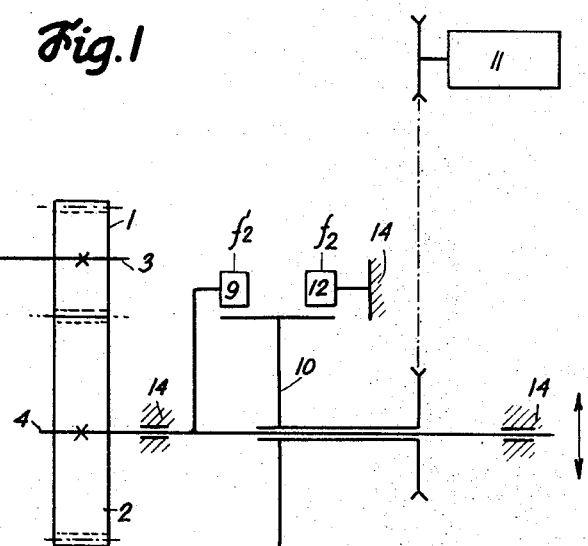
Figure 2:
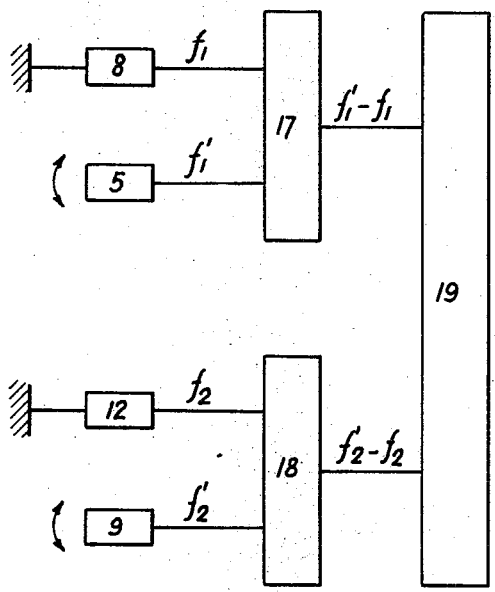

FIG. 2 is a block wiring diagram of the measuring arrangement of the present invention. The frequencies provided by the fixed pickup heads 8 and 12 and by the rotating pickup heads 5 and 9 are subtracted in the mixers 17 and 18 and phase deviations of the difference frequencies are measured and registered by a recording phase meter 19. The frequencies from the heads 8 and 5 are subtracted in the mixer 17 and the frequencies from the heads 12 and 9 are subtracted in the mixer 18. In accordance with the present invention, the arrangement for obtaining two equal frequencies is accomplished so that these frequencies are either independent of the speeds $k_1$ and $k_2$ of the transmission or are not zero at zero rotary speeds of the transmission, at $k_1 = k_2 = 0$.

SOLUTION 1

The arrangement for obtaining two equal frequencies is accomplished so that difference frequencies are provided by subtracting the frequencies or number of cycles of the two fixed pickup heads 8 and 12 from each other and by subtracting the frequencies of the two rotatable pickup heads 5 and 9 from each other.

$\Delta f = f_2 - f_1 = z_2 n_2 - z_1 n_1 = (2000)(10) - (1000)(15) = 5000$ cycles per second $\Delta f' = f'_2 - f'_1 = z_2 n_2 \pm z_2 k_2 = z_1 n_1 \pm z_1 k_1$ If we select the rotating direction of the drums so that the products $z_2 k_2$ and $z_1 k_1$ are eliminated, we obtain $f' = z_2 n_2 - z_1 n_1 = \Delta f = 5000$ cycles per second.

Thus the condition for equal frequencies is fulfilled. It is obvious that the elimination of the products $z_2 k_2$ and $z_1 k_1$ is valid for the mean values.

Due to the inaccuracies of the measured transmission of gears 1 and 2, the speeds $k_1$ and $k_2$ are relatively fluctuating so that $k_1 \neq i k_2$. These fluctuations influence the frequency $\Delta f'$ and cause phase deviations between the frequency $\Delta f'$ and the frequency $\Delta F$. Since $\Delta f = \Delta f'$ such frequencies are independent of the speed or number of revolutions $k_1$ and $k_2$. There may thus be any speed or number of revolutions, even zero.

Figure 3:
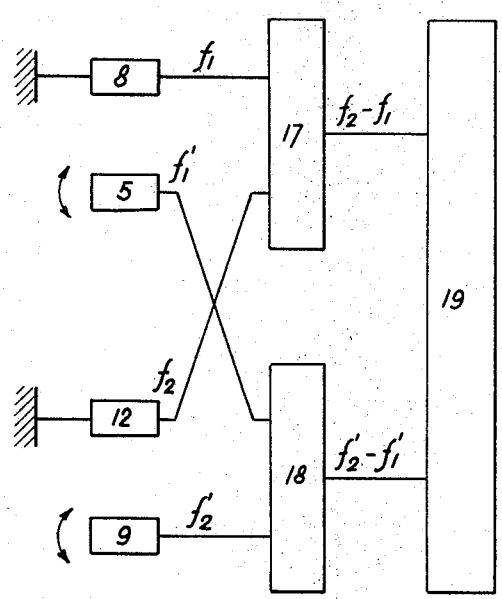

A block wiring diagram for solution 1 is shown in FIG. 3, wherein the heads 8 and 12 are connected to the mixer 17 and the heads 5 and 9 are connected to the mixer 18. The difference frequencies provided by the mixers 17 and 18 are supplied to a recording phase meter 19, which compares them.

SOLUTION 2

The arrangement for obtaining two equal frequencies is accomplished by adding the frequencies or numbers of cycles of the fixed pickup heads 8 and 12 with the frequency or number of cycles of a frequency source F, for example, $F = 5000$ cycles, of an auxiliary oscillator and the frequencies or numbers of cycles of the rotatable pickup heads 5 and 9 are subtracted from these sums:

$\Delta f_1 = f_1 + F - f'_1 = F \pm z_1 k_1 = 5000 \pm 200$ cycles per second
$\Delta f_2 = f_2 + F - f'_2 = F \pm z_2 k_2 = 5000 \pm 200$ cycles per second
$\Delta f_1 = \Delta f_2$ This solution is similar to that of the object of U.S. Pat. No. 3,096,590, except that the adding of the frequency of the auxiliary oscillator increases the frequency so that even for the transmission at standstill, where $k_1 = k_2 = 0$, the values of $\Delta f_1 = \Delta f_2 = F = 5000$ cycles per second, and measuring is possible. A block wiring diagram of solution 2 is shown in FIG. 4, wherein the pickup head 8 and the frequency source or auxiliary oscillator F are connected to a mixer 20 which adds their frequencies. The sum provided by the mixer 20 and the pickup head 5 are connected to the mixer 17, which provides the difference between them. The pickup head 12 and the frequency source F are connected to a mixer 21 which adds their frequencies. The sum provided by the mixer 21 and the pickup head 9 are connected to the mixer 18, which provides the difference between them. The difference frequencies provided by the mixers 17 and 18 are supplied to the phase meter 19, which compares them.

SOLUTION 3

The arrangement for obtaining two equal frequencies is accomplished so that the frequencies from the pickup heads 12 and 9 are subtracted from the frequency F of the auxiliary oscillator, for example, $F = 40,000$ cycles per second, and the frequencies of the fixed and rotatable heads 8 and 5 are subtracted from these difference frequencies.

$F - f_2 = F - z_2 n_2 = 40,000 - 20,000 = 20,000$ cycles per second
$F - f'_2 = F - z_2 n_2 \mp z_2 k_2$
$\Delta f = F - z_2 n_2 - z_1 n_1 = 40,000 - 20,000 - 15,000 = 5,000$ cycles per second
$\Delta f' = F - z_2 n_2 \mp z_2 k_2 - z_1 n_1 \mp z_1 k_1$ If direction of rotation of the drums is so selected that the products $z_2 k_2$ and $z_1 k_1$ are eliminated, we obtain $\Delta f' = F - z_2 n_2 - z_1 n_1 = \Delta f = 5,000$ cycles per second.

This solution is similar to solution 1. In this solution, the auxiliary oscillator permits greater facility in providing the difference frequencies.

The block wiring diagram of solution 3 is shown in FIG. 5. In FIG. 5, the head 9 and the frequency source F are connected to a mixer 22, which provides the difference between them. The difference frequency and the frequency of the head 5 are supplied to the mixer 17, which provides the difference between them. The head 12 and the frequency source F are connected to a mixer 23, which provides the difference between them. The difference frequency and the frequency of the head 8 are supplied to the mixer 18, which provides the difference between them. The difference frequencies provided by the mixers 17 and 18 are supplied to the phase meter 19, which compares them.

Further processing of the difference frequencies is described in U.S. Pat. No. 3,096,590. It is substantially a current phase measuring process with a normal recording phase meter.

The static method of measuring in accordance with the present invention offers great advantages and substantially broadens the applicability of this measuring method, and may also be accomplished in the static state by means of subsequent angular displacement.

We claim:

1. A method of measuring the precision of a gear train including an input member and an output member, said method comprising the steps of:
   moving the input member at a predetermined input speed so that the output member moves at a corresponding output speed;
   rotating a first substantially circular magnetic record of a predetermined number of signals at a speed substantially greater than the input speed;
   producing a first frequency signal in response to the predetermined number of signals and the substantially greater speed;
   producing a second frequency signal in response to the predetermined number of signals and the difference between the input speed and the substantially greater speed;
   producing a first frequency difference signal in response to the difference between the first and second frequency signals;
   adjusting said first frequency difference signal to be different from zero without change in signal phase as said gear train is moved at or near zero rotational speed;
   recording the first difference signal on a continuous substantially circular magnetic recording medium by recording means while the medium rotates at the output speed relative to the recording means so that a second continuous magnetic record of another number of frequency signals is produced on the medium, the other number and the predetermined number being related by the transmission ratio of the gear train;
   rotating the second magnetic record at a speed substantially greater than the output speed;
   producing a third frequency signal in response to the other number of signals and to the substantially greater speed of the second magnetic record;
   producing a fourth frequency signal in response to the other number of signals and the difference between the output speed;
   adjusting said fourth frequency difference signal to be the difference from zero without change in signal phase as said gear train is moved at or near zero rotational speeds;
   producing a second frequency difference signal in response to the difference between the third and fourth frequency signals and different from zero at zero rotational speeds of the gear train; and
   comparising the first and second frequency difference signals.

2. Apparatus for measuring the precision of a gear train including an input member and an output member, said apparatus comprising:
   means for moving said input member at a predetermined input speed so that said ouput member moves at a corresponding output speed;
   a first substantially circular magnetic record of a predetermined number of signals;
   means for rotating said record at a speed substantially greater than said input of signal;
   first transducer means for producing a first frequency signal in response to said predetermined number of signals and said substantially greater speed;
   second transducer means for producing a second frequency signal in response to said predetermined number of signals and the difference between said input speed and said substantially greater speed;
   first difference means for producing a first frequency difference signal in response to the difference between the first and second frequency signals;
   means for adjusting said first difference signal without change in signal phase to be different from zero as said gear train is moved at or near zero rotational speeds;
   a continuous substantially circular magnetic recording medium;
   recording means for recording said first difference signal on said recording medium so that a second continuous magnetic record of another number of frequency signals is produced on said recording medium, said other number and said predetermined number being related by the transmission ratio of said gear train;

means for rotating said recording medium at said output speed relative to said recording means;

means for rotating said second magnetic record at a speed substantially greater than said output speed;

third transducer means for producing a third frequency signal in response to said other number of signals and to said substantially greater speed of said second magnetic record;

fourth transducer means for producing a fourth frequency signal in response to said other number of signals and the difference between said output speed and the substantially greater speed of said second magnetic record;

second difference means for producing a second frequency difference signal in response to the difference between the third and fourth frequency signals; and means for adjusting said second frequency difference signal without change in signal phase to be different from zero as said gear train is moved at or near zero rotational speeds.

3. Apparatus as claimed in claim 2, wherein one of said first and second transducer means and one of said third and fourth transducer means comprises a fixedly mounted pickup head, the other of said first and second transducer means and the other of said third and fourth transducer means comprises a mobile pickup head, said first frequency difference signal being the difference between the signals produced by the fixedly mounted and mobile pickup heads of said first and second transducer means and said second frequency difference signal being the difference between the signals produced by the fixedly mounted and mobile pickup heads of said third and fourth transducer means.

4. Apparatus as claimed in claim 2, further comprising oscillator means for producing a signal of specific frequency, and wherein one of said first and second transducer means and one of said third and fourth transducer means comprises a fixedly mounted pickup head, the other of said first and second transducer means and the other of said third and fourth transducer means comprises a mobile pickup head, said first frequency difference signal being the difference between the sum of the signals produced by the fixedly mounted pickup head of said first and second transducer means and said signal of specific frequency and the signals produced by the mobile pickup head of said first and second transducer means and said second frequency difference signal being the difference between the sum of the signals produced by the fixedly mounted pickup head of said third and fourth transducer means and said signal of specific frequency and the signals produced by the mobile pickup head of said third and fourth transducer means.

5. Apparatus as claimed in claim 2, further comprising oscillator means for producing a signal of specific frequency, and wherein one of said first and second transducer means and one of said third and fourth transducer means comprises a fixedly mounted pickup head, the other of said first and second transducer means and the other of said third and fourth transducer means comprises a mobile pickup head, said first frequency difference signal being the difference between said signal of specific frequency and the signals produced by the fixedly mounted pickup head of said first and second transducer means and the signals produced by the fixedly mounted pickup head of said third and fourth transducer means and said second frequency difference signal being the difference between said signal of specific frequency and the signals produced by the mobile pickup head of said first and second transducer means and the signals produced by the mobile pickup head of said third and fourth transducer means.

References Cited
UNITED STATES PATENTS

| | | | |
|---|---|---|---|
| 3,096,590 | 7/1963 | Stepanek | 33—179.5 |
| 2,821,785 | 2/1958 | Lekas | 33—179.5 |

SAMUEL S. MATTHEWS, Primary Examiner